US 8,645,000 B2

(12) United States Patent
Park

(10) Patent No.: US 8,645,000 B2
(45) Date of Patent: Feb. 4, 2014

(54) TEMPERATURE CONTROLLER HAVING PHASE CONTROL AND ZERO-CROSS CYCLE CONTROL FUNCTIONALITY

(75) Inventor: Hwan-Ki Park, Busan (KR)

(73) Assignee: Autonics Corporation, Gyeongsangnam-Do (KR)

( * ) Notice: Subject to any disclaimer, the term of this patent is extended or adjusted under 35 U.S.C. 154(b) by 694 days.

(21) Appl. No.: 12/936,203

(22) PCT Filed: Sep. 8, 2009

(86) PCT No.: PCT/KR2009/005066
§ 371 (c)(1),
(2), (4) Date: Oct. 1, 2010

(87) PCT Pub. No.: WO2010/035967
PCT Pub. Date: Apr. 1, 2010

(65) Prior Publication Data
US 2011/0046811 A1  Feb. 24, 2011

(30) Foreign Application Priority Data

Sep. 27, 2008  (KR) .................. 10-2008-0095001

(51) Int. Cl.
*G05D 23/00*  (2006.01)
(52) U.S. Cl.
USPC ........................................................ 700/299
(58) Field of Classification Search
USPC .................... 700/297, 298, 299, 300
See application file for complete search history.

(56) References Cited

U.S. PATENT DOCUMENTS

| | | | |
|---|---|---|---|
| 3,937,921 A * | 2/1976 | Furuichi et al. | 219/494 |
| 4,720,623 A | 1/1988 | DiCesare et al. | |
| 4,900,900 A * | 2/1990 | Shirae et al. | 219/501 |
| 7,567,085 B2 | 7/2009 | Kim et al. | |
| 2006/0152224 A1 | 7/2006 | Kim et al. | |

FOREIGN PATENT DOCUMENTS

| | | |
|---|---|---|
| EP | 0 886 459 A2 | 12/1998 |
| EP | 0 883 246 B1 | 10/2004 |
| JP | 2000-293072 | 10/2000 |
| JP | 2006-164615 A | 6/2006 |
| JP | 2008-052488 A | 3/2008 |
| JP | 2008-172914 A | 7/2008 |
| JP | 2008-209718 A | 9/2008 |
| KR | 1986-0001694 | 7/1986 |
| KR | 1987-0002144 | 6/1987 |
| KR | 10-0546246 | 11/2004 |
| KR | 10-0647845 | 11/2005 |

(Continued)

OTHER PUBLICATIONS

International Search Report mailed Apr. 20, 2010, for International Application No. PCT/KR2009/005066.

(Continued)

*Primary Examiner* — Sean P. Shechtman
*Assistant Examiner* — Chad Rapp
(74) *Attorney, Agent, or Firm* — Hershkovitz & Associates, PLLC; Abraham Hershkovitz

(57) ABSTRACT

The present invention relates to a temperature controller having phase control and zero-cross cycle control function that can be achieved at a low cost by controlling power that is supplied to a load, by generating a phase control signal or a zero-cross control signal according to control target temperature of a load, using a microcomputer.

5 Claims, 3 Drawing Sheets

(56) References Cited

FOREIGN PATENT DOCUMENTS

| KR | 10-0845693 | 7/2008 |
|---|---|---|
| RU | 2 075 776 C1 | 3/1997 |
| SU | 1 403 025 A1 | 6/1988 |

OTHER PUBLICATIONS

English Abstract of KR 10-0845693.
English Abstract of KR 10-0647845.
English Abstract of KR 10-0546246.
2 Muhammad H. Rasid, Muhammad H. Rasid Virgilio González y Pozo Agustín Suárez Fernández, Electrónica de potencia: circuitos, dispositivos y aplicaciones, p. 770, 3rd ed., Pearson Educación, 2004, ISBN 9702605326, 9789702605324.
Colombian Office Action dated Mar. 8, 2013.
English Abstract of JP 2008-172914 A.
English Abstract of JP 2008-209718 A.
English Abstract of JP 2006-164615 A.
English Abstract of JP 2008-052488 A.
English Abstract of JP 2000-293072 A.

* cited by examiner

TEMPERATURE CONTROLLER HAVING PHASE CONTROL AND ZERO-CROSS CYCLE CONTROL FUNCTIONALITY

TECHNICAL FIELD

The present invention relates to a temperature controller that controls the temperature of a load to a target temperature in accordance with load side temperature sensed by a temperature sensor, and more particularly, to a temperature controller having phase control and zero-cross cycle control functions that generate a phase control signal or zero-cross control signal according to control target temperature of a load to control power that is supplied to the load.

BACKGROUND ART

In general, typical control signals outputted from temperature controllers to control a load are a relay output for controlling a relay, an SSR output for driving an SSR (Solid State Relay), and a current output of 4 to 20 mA outputted as a current signal having a magnitude corresponding to a control target value within a present range.

In order to accurately control temperature, an SCR phase controller or an SCR zero-cross cycle controller 20 outside a temperature controller 10 is connected to a terminal outputting current at 4 to 20 mA, as shown in FIG. 1, in which it is possible to increase/decrease heating value of a load 40, for example, a heater, by increasing/decreasing power supplied to the load from an AC power supply to control temperature of the load 40 to a target temperature, in accordance with temperature of the load 40 which is sensed by a temperature sensor 30.

DISCLOSURE

Technical Problem

However, the controllers, such as the SCR phase controller and the SCR zero-cross cycle controller, are expensive and large in volume, such that there are several problems in using the controllers, including large cost and difficulty in using a space.

The present invention has been made to overcome the problems and it is an object of the present invention to provide a temperature controller having phase control and zero-cross cycle control functions that can accurately control temperature, using inexpensive small parts having simple functions, instead of the expensive SCR phase controller or SCR zero-cross cycle controller.

Technical Solution

In order to achieve the objects, an exemplary embodiment of the present invention provides a temperature controller having phase control and zero-cross cycle control functions that control a load at a preset target temperature by performing phase control or zero-cross control on power supplied to a load after sensing and analyzing temperature of the load with a temperature sensor, which includes: a power supply synchronization circuit part that extracts a synchronization signal from an AC power; a power circuit part in which an AC power supply is connected to a first coil of a transformer, and a drive power generation part and a triac trigger power generation part are respectively furnished on a second coil; a microcomputer that generates a phase control signal or a zero-cross cycle control signal to analyze temperature of the load sensed by a temperature sensor and control the temperature to a target temperature; and a triac drive part that applies power generated from the trigger power supply generation part as a trigger signal to a gate of a triac connected to the load in accordance with a phase control signal or a zero-cross cycle control signal of the microcomputer.

The power supply synchronization circuit is provided with a photo coupler to maintain insulation between the AC power supply and the microcomputer.

Further, the power triac drive part is provided with a photo coupler to maintain insulation between the microcomputer and the load side triac.

A user operation part for selecting phase control function or zero-cross cycle control function of the microcomputer is provide to an input terminal of the microcomputer.

Advantageous Effects

By using phase control or zero-cross cycle control output of a temperature controller according to the exemplary embodiment of the present invention, it is possible to use phase control function or zero-cross cycle control function by directly connecting an inexpensive small random turn-on type SSR (Solid State Relay) having simple function or a triac, instead of an expensive and large SCR phase controller or an SCR zero-cross cycle controller, such that it is possible to reduce cost and provide convenience for users of the temperature controller while improving space usability.

BEST MODE

The configuration and operation of an exemplary embodiment of the present invention is described hereafter in detail with reference to the accompanying drawings.

The present invention can reduce cost and provide convenience for users of a temperature controller 1 while improving space usability, by adding phase control function and zero-cross cycle control function to the function of a microcomputer 100 in the temperature controller 1 in order to allow the users to directly select the control functions and replace expensive and large devices, such as the existing SCR phase controller or SCR zero-cross cycle controller with an inexpensive small random turn-on type SSR (Solid State Relay) or a triac which have simple functions.

Figure 1:
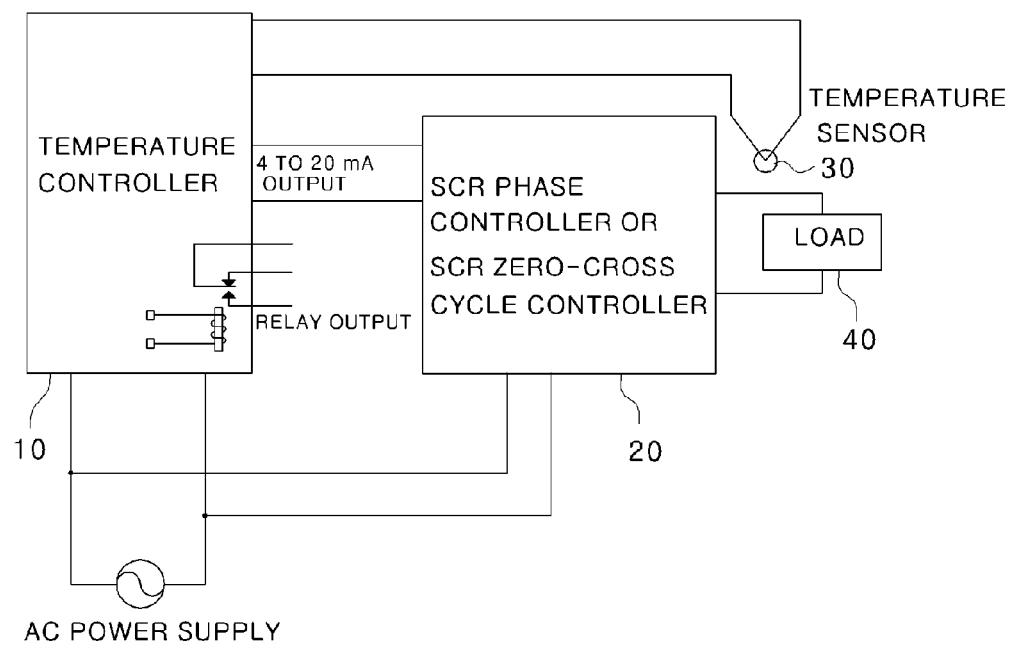
FIG. 1 is a diagram illustrating the configuration of a temperature of the related art.
Figure 2:
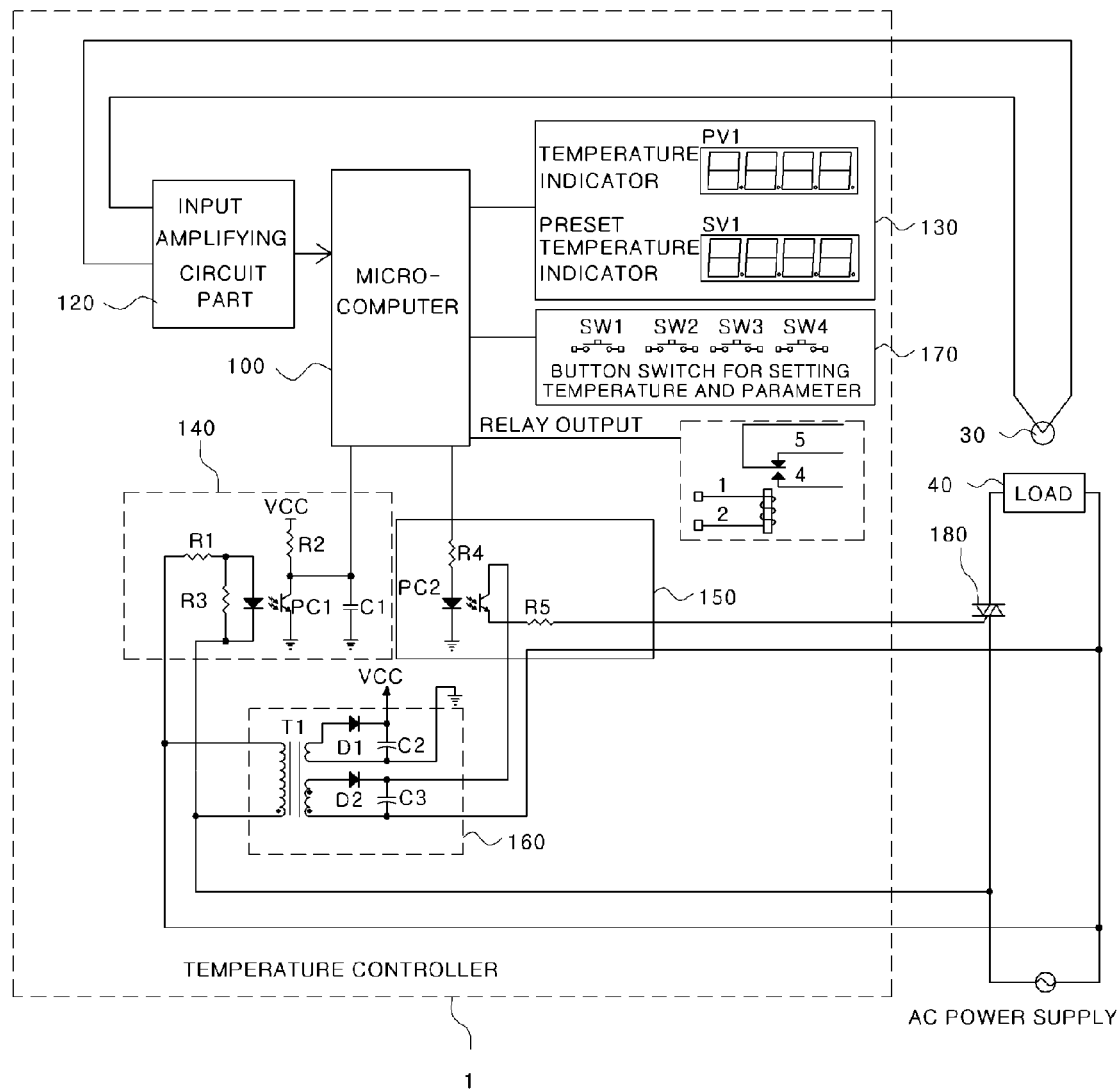
FIG. 2 is a diagram illustrating the configuration of a temperature controller according to an exemplary embodiment of the present invention.

FIG. 2 is a diagram illustrating the configuration of an exemplary embodiment of the present invention.

A temperature sensor 30 that senses temperature of a load is connected to one of the input terminals of a microcomputer 100 controlling general operations of the temperature controller 1, through an input amplifying circuit 120. The input amplifying circuit 120 is provided to amplify a temperature signal sensed by the temperature sensor 30 into a signal having a magnitude which can be used in the microcomputer 100. Further, a display unit 130 is connected to one of the output terminals of the microcomputer 100 to allow a user to easily see the current temperature of a load and control target temperature of the load.

Further, the microcomputer 100 is programmed to control phase control or zero-cross cycle control on power supplied to the load in response to a control signal synchronized to the AC power after calculating a control output value by comparing the current temperature of the load sensed by the temperature sensor 30 with control target temperature preset by a user in order to control the temperature of the load 40 at the target temperature, which is described below.

In particular, in order to control the power supplied to the load, a power supply synchronization circuit part 140 is connected between to one of the input terminals of the microcomputer 100 between the microcomputer and the AC power supply. The power supply synchronization circuit part 140 has a photo coupler PC1, in which a light emitting diode is connected to the AC power supply and a light receiving transistor is connected to the microcomputer 100, and resistances R1, R2, and R3 and a condenser C1 is added to the light emitting diode and the light receiving transistor, such that the light receiving transistor is turned on and inputs a signal synchronized with the power supply into the microcomputer 100, when power is applied to the light emitting diode. Since the synchronization signal inputted into the microcomputer 100 from the power supply synchronization circuit part 140 is generated by the photo coupler PC1, malfunction due to power noise is prevented by maintaining insulation from the AC power supply.

Further, the load 40, particularly the gate of a triac 180 for switching the AC power supplied to the load 40 is connected to one of the output terminals of the microcomputer 100 through a triac drive part 150. It is preferable that the triac drive part 150 also maintains insulation, using a photo coupler PC2 to prevent malfunction due to noise. That is, the light emitting diode of the photo coupler PC2 is connected to the microcomputer 100 through a resistance R4 and the light receiving transistor is connected to the triac 180 through a resistance R5.

Meanwhile, the power supply synchronization circuit part 140 for extracting a power synchronization signal from the AC power supply is connected to the AC power, as described above, and a power supply circuit part 160 generating power for the temperature controller 1 is connected thereto. The power supply circuit part 160 has a drive power generation part that generates driver power Vcc that is supplied to each circuit part of the temperature controller 1 by dropping the AC power through a power transformer T1, and a trigger power generation part that generates trigger power that is applied to the gate of the triac 180.

The drive power generation part levels and outputs voltage dropped to a predetermined level by the secondary side of the power transformer T1 to the diode D1 and the condenser C2, and similarly, the trigger power generation part levels and outputs voltage dropped to a predetermined level by another secondary side of the power transformer T1 to a diode D2 and a condenser C3. The voltage generated from the trigger power generation part is applied to the gate of the triac 180 through the triac drive part 150.

A user operation part 170 is connected to the input terminal of the microcomputer 100 in order for the user to select the phase control function or the zero-cross cycle control function provided to the microcomputer.

In the exemplary embodiment, although the triac 180 is exemplified as a device for switching power supplied to the load 40, the present invention is not limited thereto and it is apparent to those skilled in the art that other switch device or other components equivalent thereto may be used without departing from the scope of the present invention.

Figure 3:
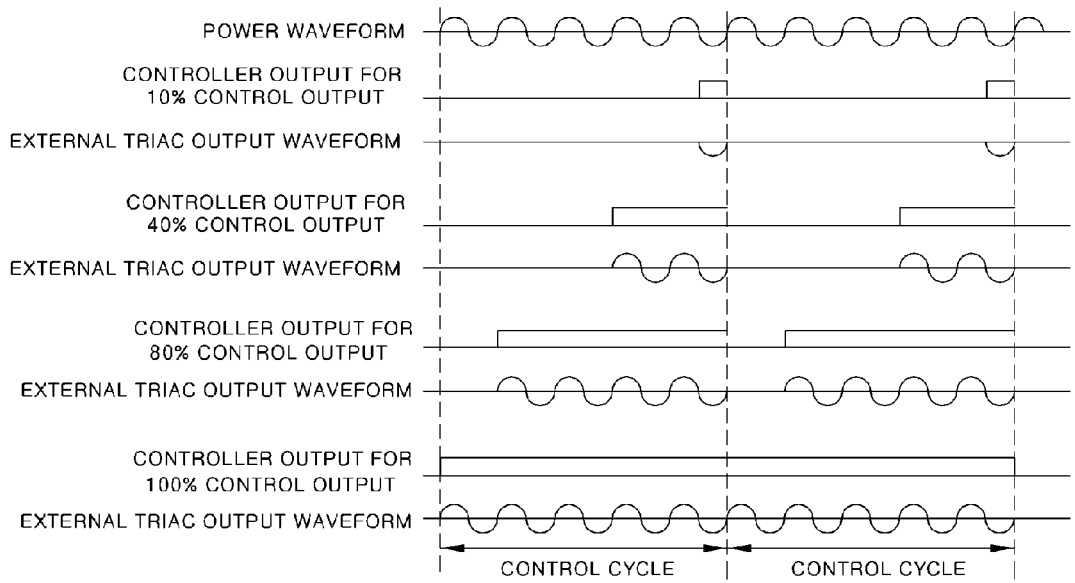
FIG. 3 is a diagram showing the main waveform according to zero-cross cycle control of the present invention.

FIG. 3 is a diagram showing the main waveform according to zero-cross cycle control among the control functions of the present invention.

The zero-cross cycle control according to an exemplary embodiment of the present invention sets a predetermined cycle of power frequency as a control cycle, and supplies a predetermined period for the cycle by turning-on/off in proportion to a control output value. FIG. 3 is a diagram showing waveforms of a trigger signal outputted from the triac drive part 150 and the power applied to the load 40 through the triac 180, when ten half-cycles are set as control cycles, and particularly, output waveforms of the triac 180, when the control output of the load 40 is 10%, 40%, 80%, and 100%.

For example, when the control output value is 10%, a control signal having a cycle for supplying only one of the ten half-cycles in the AC power to the load is outputted from the microcomputer 100 and transmitted to the photo coupler PC2. Accordingly, the light receiving transistor of the photo coupler PC2 is turned on for the cycle, the voltage leveled by the diode D2 and the condenser C3 is applied as a trigger signal to the gate of the triac 180 through the light receiving transistor that is turned on, and the triac 180 is turned on, such that the voltage of only one half-cycle in the ten half-cycles is applied from the AC power supply to the load 40.

In a similar method, when the control output value is 40%, only four of the ten half-cycles are supplied to the load 40 from the AC power supply, when the control output value is 80%, only eight of the ten half-cycles are supplied to the load 40 from the AC power supply, and when the control output value is 100%, all of the ten half-cycles are supplied to the load 40.

The microcomputer 100 can supply power synchronized with the power frequency to the load 40 by outputting a control signal synchronized with the power frequency to the triac drive part 150, using a synchronization signal extracted from the AC power supply by the power supply synchronization part 140.

Figure 4:
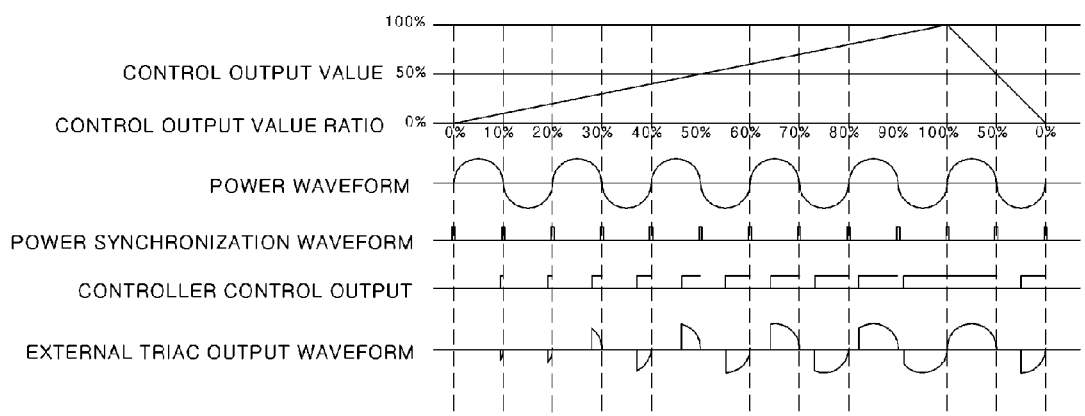
FIG. 4 is a diagram showing the main waveform according to phase control of the present invention.

FIG. 4 shows the main waveform according to the phase control of the control functions of the present invention.

The phase control according to the present invention, as shown in FIG. 4, supplies power to the load 40 only for the time that is proportioned to the control output value in the half-cycles of the power frequency, by using the half-cycle of the power frequency as a control cycle.

That is, when the control output value is 20%, only 20% of the half-cycle of the AC power supply is supplied to the load 40, when the control output value is 50%, only 50% of the half-cycle of the AC power is supplied to the load 40, and when the control output value is 100%, all of the half-cycle is supplied to the load 40.

For this purpose, the microcomputer 100 outputs a control output value by comparing the sensed temperature received from the temperature sensor 30 with the target temperature preset by the user and determines the phase of the AC power supplied to the load 40 in response to a power signal received from the power synchronization circuit part 140, thereby outputting the above-mentioned control signal synchronized with the power frequency. The control signal is outputted as a signal kept turned on for the time, for example, corresponding to 10% . . . 50% . . . or 100%, as the waveform showing controller control output in FIG. 4.

The AC power is supplied to the load 40 and the load 40 can maintain the target temperature while the triac 180 is turned on by the controller control power.

INDUSTRIAL APPLICABILITY

As described above, the temperature controller according to an exemplary embodiment of the present invention is composed of inexpensive components and can control power that is supplied to the load, by using a phase control means or a zero-cross cycle control means.

The invention claimed is:

1. A temperature controller having phase control and zero-cross cycle control function that controls a load at a preset target temperature by performing phase control or zero-cross control on power supplied to a load after sensing and analyzing temperature of the load with a temperature sensor, the temperature controller comprising:
   a power supply synchronization circuit part that extracts a synchronization signal from an AC power;
   a power circuit part in which an AC power supply is connected to a first coil of a transformer, and a drive power generation part and a triac trigger power generation part are respectively furnished on a second coil;
   a microcomputer that generates a phase control signal to supply power to the load only for time that is proportioned to a control output value in half-cycle of a power frequency, by using the half-cycle of the power frequency as a control cycle or a zero-cross cycle control signal to supply power to the load only for time that is proportioned to a control output value in a control cycle by using a predetermined cycle of power frequency as the control cycle, to analyze temperature of the load sensed by a temperature sensor and control the temperature to target temperature; and
   a triac drive part that applies power generated from the trigger power supply generation part as a trigger signal to a gate of a triac connected to the load in accordance with a phase control signal or a zero-cross cycle control signal of the microcomputer.

2. The temperature controller having phase control and zero-cross cycle control functions according to claim 1, wherein the power supply synchronization circuit is provided with a photo coupler to maintain insulation between the AC power supply and the microcomputer.

3. The temperature controller having phase control and zero-cross cycle control functions according to claim 1, wherein the power triac drive part is provided with a photo coupler to maintain insulation between the microcomputer and the load side triac.

4. The temperature controller having phase control and zero-cross cycle control function according to claim 1, wherein the phase control function or the zero-cross cycle control function of the microcomputer is selected by a user operation part.

5. The temperature controller having phase control and zero-cross cycle control functions according to claim 2, wherein the power triac drive part is provided with a photo coupler to maintain insulation between the microcomputer and the load side triac.

* * * * *